(12) United States Patent
Kumar

(10) Patent No.: US 7,937,433 B1
(45) Date of Patent: May 3, 2011

(54) QUEUING CONNECTOR TO PROMOTE MESSAGE SERVICING

(75) Inventor: Nandhu Kumar, Overland Park, KS (US)

(73) Assignee: Embarq Holdings Company, LLC, Overland Park, KS (US)

(*) Notice: Subject to any disclaimer, the term of this patent is extended or adjusted under 35 U.S.C. 154(b) by 1096 days.

(21) Appl. No.: 10/668,732

(22) Filed: Sep. 23, 2003

(51) Int. Cl.
*G06F 15/16* (2006.01)
*G06F 3/00* (2006.01)

(52) U.S. Cl. ........ 709/203; 709/200; 709/204; 719/314; 719/315

(58) Field of Classification Search .......... 709/205, 709/206, 207, 200, 203, 204; 719/314–315
See application file for complete search history.

(56) References Cited

U.S. PATENT DOCUMENTS

| | | | | |
|---|---|---|---|---|
| 5,799,156 A * | 8/1998 | Hogan et al. | ........ | 709/237 |
| 6,058,389 A * | 5/2000 | Chandra et al. | ........ | 707/1 |
| 6,134,244 A * | 10/2000 | Van Renesse et al. | ........ | 370/469 |
| 6,377,993 B1 * | 4/2002 | Brandt et al. | ........ | 709/227 |
| 6,510,550 B1 * | 1/2003 | Hightower et al. | ........ | 717/108 |
| 6,604,196 B1 * | 8/2003 | Monday et al. | ........ | 713/100 |
| 6,654,805 B1 * | 11/2003 | Aldred et al. | ........ | 709/224 |
| 6,847,974 B2 * | 1/2005 | Wachtel | ........ | 707/101 |
| 6,915,519 B2 * | 7/2005 | Williamson et al. | ........ | 719/313 |
| 7,047,292 B1 * | 5/2006 | Stewart et al. | ........ | 709/224 |
| 7,051,334 B1 * | 5/2006 | Porter et al. | ........ | 719/313 |
| 7,152,094 B1 * | 12/2006 | Jannu et al. | ........ | 709/206 |
| 2001/0052031 A1 * | 12/2001 | Kinkade | ........ | 719/314 |
| 2002/0156814 A1 * | 10/2002 | Ho | ........ | 707/514 |
| 2003/0093471 A1 * | 5/2003 | Upton | ........ | 709/203 |
| 2003/0130984 A1 * | 7/2003 | Quinlan et al. | ........ | 707/1 |
| 2003/0177279 A1 * | 9/2003 | Evans | ........ | 709/315 |
| 2003/0212834 A1 * | 11/2003 | Potter et al. | ........ | 709/318 |
| 2003/0226142 A1 * | 12/2003 | Rand | ........ | 725/32 |
| 2004/0230982 A1 * | 11/2004 | Wookey | ........ | 718/106 |
| 2004/0236780 A1 * | 11/2004 | Blevins et al. | ........ | 707/102 |
| 2005/0044197 A1 * | 2/2005 | Lai | ........ | 709/223 |

* cited by examiner

*Primary Examiner* — Philip J Chea
(74) *Attorney, Agent, or Firm* — SNR Denton US LLP

(57) ABSTRACT

A system for delivering messages to a business component is provided. A Java Message Service (JMS) enabled connector from a first JMS enabled queue, and from a second queue, a file based queue using a polling notification type of architecture, which will act as a JMS enabled queue with a publication/subscription notification type of architecture through the use of a JMS enabled wrapper which acts on the second queue. The JMS enabled connector serves as the interface to the business component, and is operable to transform the message, and further operable to record, in a standard format, information about messages delivered from the first queue and from the second queue. A method for delivering messages to a business component is also provided.

28 Claims, 1 Drawing Sheet

100 / The Distributed Processing Environment

The Distributed Processing Environment

QUEUING CONNECTOR TO PROMOTE MESSAGE SERVICING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the transfer of data between disparate computing systems. More specifically, a bridge is provided that facilities transfers between a message queue system and a business process component.

BACKGROUND OF THE INVENTION

In a computer network, computer systems are joined together to exchange information and share resources. Thus, a computer network functions as a distributed computing environment in which networked computer systems provide users with the capabilities of the distributed resources of the network. Functions provided by a computer network include connecting, integrating or allowing access to remote files, databases, or printers, as well as distributing a process among multiple systems, allowing for an application to process on two or more computers. In such a distributed computing environment, the components of an application may reside on various machines, but work together. For example, each workstation in a computer network often provides a user interface, local analysis, and data processing, while larger, host computers, for example a file server or a mainframe, may maintain a large set of data files, coordinate access to large databases, and perform larger scale data processing.

In a distributed processing environment, each application or process must be able to communicate and exchange information with other applications or processes in the environment. Currently, many inter-applications or inter-process exchanges are performed using a messaging technique commonly referred to as message queuing. In message queuing, a first (or "client") process passes a message that includes a request for processing by a second (or "server") process. The messages queues at the server process, awaiting handling thereby. In turn, the server process returns to the client process an alert or notification when the results from the server process become available. The server process may send additional alerts or notifications to other applications or processes beyond the client process.

A message queuing messaging technique may be further characterized as being a "trigger initialized" messaging technique if a notification is issued to the server process upon placement of the request message in the message queue and the message queue meets certain specified criteria. Numerous middleware software programs exist commercially to facilitate such data transfers. One example of such a middleware software program which uses a trigger initialized message queuing messaging technique comes from International Business Machines Corporation of Armonk, N.Y., (IBM) who provides commercially a software family known as MQ SERIES, a file based queue system. IBM has stated that the MQ SERIES is able to connect any two computing systems in common commercial use, such as a business component, for example BUSINESSWARE BUSINESS PROCESS INTEGRATION made commercially available by VITRIA of Sunnyvale, Calif.

SUMMARY OF THE INVENTION

A preferred embodiment of the present disclosure provides a system for a queuing connector message service, coupled to a business component which utilizes messages to a first queue of managed message services and to a second queue of managed message services. The queue connector between the business component and the first and the second queue respectively operates to communicate messages from the first queue and from the second queue to the business component. The business component being coupled via the message queue connector to the first message queue and to the second message queue may be a single application, an integrated suite of business process applications, a server, or other process.

In a preferred embodiment, the first queue utilizes a publication/subscription notification type of architecture known to those of skill in the art, and may take the form of a Java Message Service (JMS) application programming interface (API), a standard defined by SUN MICROSYSTEMS of Santa Clara, Calif., to provide reliable, asynchronous communication between components in a distributed computing environment. The first queue may use such an interface standard to retrieve messages from a file. Depending on the embodiment, such a file may reside locally on a machine or may be on a remote system from the first queue. An alternative embodiment making use of such an interface standard may locate the message from remote sources. Messages from remote sources may be identified with an Universal Resource Identifier (URI), and be accessed by using protocols such as the hyper text transfer protocol (HTTP), or another protocol known to those of skill in the art, such as the file transfer protocol (FTP). In a preferred embodiment, the queue connector will subscribe to notifications from the first queue, and the first queue will publish notification of a message in the first queue to the queue connector.

In a preferred embodiment, the second queue may utilize a notification type of architecture other than that of the publication/subscription notification type of architecture, including but not limited to a polling notification type of architecture known to those of skill in the art. The second queue operates behind a wrapper process, with the wrapper process enabled to operate in a publication/subscription notification type of architecture. The wrapper process provides a method of translating between the notification method of the second queue and the publication/subscription notification type of architecture of the queue connector. The second queue need not take the form of a JMS API, as the wrapper process around the second queue will enable the second queue to operate as a JMS API, and in a preferred embodiment the queue connector can register as a JMS client with the wrapper process of the second queue.

In a preferred embodiment, the system of the queue connector will comply with the JMS API as defined by SUN MICROSYSTEMS, INC of Santa Clara, Calif., a standard known to those of skill in the art. This queue connector can, in certain embodiments, transform a message sent to the business component from the first queue or from the second queue. Such a transformation may edit and/or remove information including but not limited to headers and extraneous data, such as the TCP/IP packet headers. The queue connector may also create a record by such a transformation, with or without altering the original message. This record can include information about the message; for example the date and time of the message and, as another example, information regarding the origin and processing of the message.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
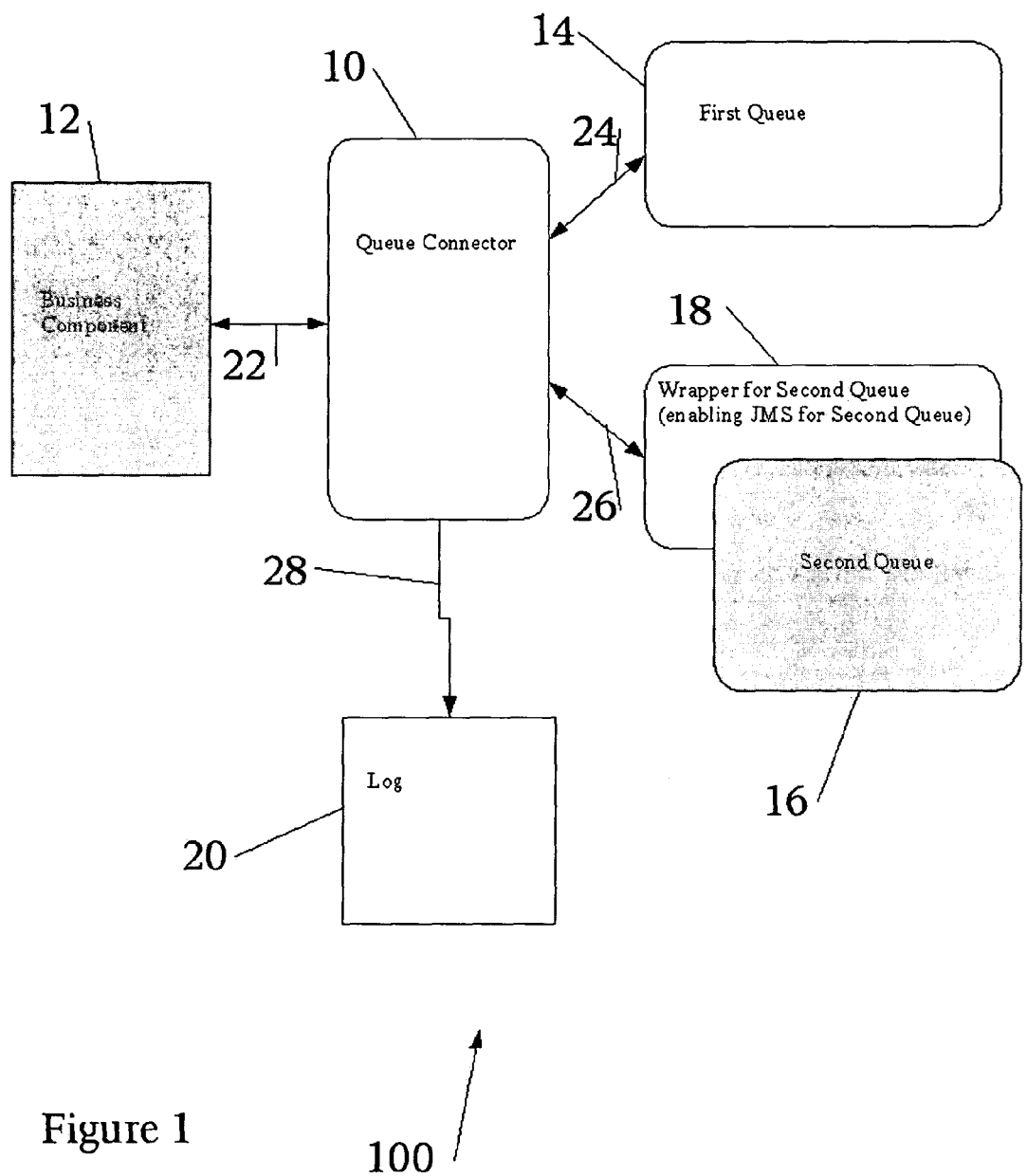
FIG. 1 is a block diagram showing one implementation of message queues coupled to a business component in a distributed processing environment under an embodiment of the Queuing Connector to Promote Message Servicing.

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

With the current technology, when a message queue such as IBM's MQ SERIES accepts a message from the client process to deliver to the server process, the client process typically deletes the message and considers this message to be consumed by the server process. Should the server process fail to complete the processing of a message from the message queue, perhaps because of a hardware failure, a software bug, or system overload, the information in the message becomes lost.

The techniques used by existing technology have several limitations in their current implementation. Business components, such as BUSINESSWARE from VITRIA, may have an interface that allows a direct connection with a file based message queue such as IBM's MQ Series. Such direct interfaces may use a polling operation to query the message queue to determine the presence or absence of a new message in the queue for processing. As the number of queues increases, and the volume of messages in the queues increases, the polling required by the server increases at rate which may degrade the performance of the business component or the networked environment. The terms businessware, BUSINESSWARE and Vitria, as used herein, include, but are not limited to, BUSINESS PROCESS INTEGRATION by VITRIA, VITRIA business components and applications, including similar or compatible applications and components, whether or not developed or released by VITRIA, including past and future versions and releases.

A drawback to trigger initialized message queuing messaging techniques such as that disclosed in the MQ SERIES messaging software is that, if a message is already waiting in a queue when a new message arrives, the trigger flag is not set or otherwise checked when the new message arrives. As a result, if an error occurred during the arrival of a prior message and the trigger flag was not set upon the arrival of the prior message, then all later arriving messages will begin to back up in the queue because the trigger flag remains unset. As a result, both the original message as well as the later arriving messages will not be retrieved by the server process and the requesting messages issued by the client process will remain unprocessed.

When there are problems in the system, such as errors and failures, tracing information and errors back through a message queue system with current implementations may prove quite challenging, as the information provided by record logs from current message queue systems may lack crucial information to allow for adequate analysis. In addition, the different queues may record such information in different formats, increase the complexity of tracing information through the message queue system.

A traditional technique used to identify problems in queues is to select individual queues for testing. To test a queue, an administrator constructs a message designed to pass through that queue. If the message fails to arrive in a specified period of time, then the administrator can reasonably conclude that the selected queue is having problems. It should be readily appreciated that to diagnose problems in a queue-based messaging system by testing individual queues thereof would be a laborious and time consuming task, particularly if the queue-based messaging system has many queues.

Accordingly, many queue-based messaging systems are equipped with an interface which enables the administrator to review the queues themselves. Heretofore, however, the administrator interface has not been properly designed to enable the administrator to readily identify and rectify problems in the message queues. For example, while the MQ SERIES messaging software is equipped with a message queue interface (MQI) through which a series of administrative functions may be executed, such administrative functions operate on a queue-level. Using the MQI, the administrator is able to review the status of a selected queue but cannot simultaneously review the status of plural queues. Thus, if a problem develops at the server process due to a problem with one of the message queues maintained thereat, the administrator must review the functioning of each queue to locate the problem queue. Furthermore, the administrative tools available to the administrator through the MQI are not particularly well configured to diagnose problems within a queue.

Software to facilitate data transfers to a business component from a message queue, such as IBM's MQ SERIES, may possesses numerous interfaces, with one such interface connecting the server to a client, such as a Java application, while another interface may connect the server through the use of the Java Message Service (JMS), a set of messaging interfaces defined by SUN MICROSYSTEMS of Santa Clara, Calif., to a client Java application that uses JMS. The introduction of the JMS standard application programming interface (API) for inter-client communication provided the opportunity for increased efficiency for messaging queues, as well as increase the ease of administration.

The present disclosure illustrated in FIG. 1 provides a system and method for using a queue connector 10 to deliver messages to a business component 12 in a distributed processing environment 100. The queue connector 10 is coupled to the business component 12 through a coupling 22. In an exemplary embodiment, the queue connector 10 follows the standards of the JMS API. The queue connector 10 is coupled with a first message queue 14 through a coupling 24. The queue connector 10 also couples with a message queue 16 through a coupling 26. The message queue 16 operates inside of a wrapper process 18.

The message queue 14 uses a publication/subscription notification type of architecture to notify the queue connector 10 when the message queue 14 has a message or notification to deliver to the queue connector 10 through the coupling 24. In one embodiment, this publication/subscription notification type of architecture may follow the JMS standard. In an embodiment, the message queue 14 may accept messages originating from a file, from a Universal Resource Identifiers (URI) remotely via a protocol such as the hyper-text transport protocol (HTTP), or other such message sources as the JMS standard may include. In one embodiment, the message queue 14 may transfer the entire message to the queue connector 10, while in other embodiments, the message queue 14 transmits only the location of the message to the queue connector 10. While FIG. 1 only displays the single message queue 14, the process of the message queue 14 could take place among plural applications. In other embodiments, the message queue 14 could take place among plural systems, or it could represent a process which requires some combination of applications and systems.

The message queue 16 uses a notification type of architecture other than a publication/subscription type of architecture. In an embodiment, this could take the form of a file based queue using a polling notification type of architecture, such as IBM's MQ SERIES. In one embodiment, the wrapper process 18 translates the notifications generated by the native notification type of architecture of the message queue 16 to notifications of a publication/subscription type of architecture operable for use by the queue connector 10. In a preferred embodiment, this may take the form of a notification adhering to the JMS standard. The wrapper process 18 publishes notifications of messages in the message queue 16 to the queue connector 10 through the coupling 26. While FIG. 1 only displays the single message queue 16, the process of the message queue 16 could take place among plural applications. In other embodiments, the message queue 16 could take place among plural systems, or it could represent a process which requires some combination of applications and systems.

The specifics of the disclosure address adding a wrapper process around a message queue, such as the wrapper process 18 around the message queue 16 as shown in FIG. 1, so as to enable a publication/subscription notification type of architecture such as is available in JMS. One of skill in the art will recognize that the advantages provided by this disclosure would apply to any message queue system where notification of a message took place by a method other than that of a publication/subscription type of notification architecture, such as by a polling notification type of architecture. Hence the present disclosure could also apply to any message queue system for which a JMS enable wrapper could be applied, regardless of the underlying queue structure or type of notification architecture.

The different queue types that process the message queue 16 may represent include, but are not limited to, a dead-letter queue, a system command queue, a system default queue, a channel queue, an event queue, a model queue, and a dynamic queue. The dead-letter queue is a local queue on which the queue manager and applications put messages they cannot deliver. The system command queue is a queue to which suitably authorized applications can send system commands. System default queues are used to maintain default queue definitions. Channel queues are used for distributed queue management. Event queues hold event messages to be reported by the queue manager or a channel. A model queue is a template for a queue definition. Using the attributes of the model queue, the queue manager can dynamically create either a temporary dynamic or a permanent local queue.

These examples illustrates some of the types of queues that the message queue 16 may take in a given embodiment, and is not intended to be limiting. Regardless of the type of queue of message queue 16, the wrapper process 18 is operable to reduce the process load on the business component 12 by removing the requirement for the business component 12 to constantly query the message queue 16 directly to determine the existence of new messages. The wrapper process 18 assumes this function, enabling a publication/subscription notification type of architecture to the queue connector 10. As the total volume of messages in the system increases, the removal of this requirement from the business component 12 may result in significant improvement in performance.

The preferred embodiment starts with the queue connector 10 operable to receive the notifications of message from both the message queue 14 and the message queue 16. When a message arrives in the message queue 14, the message queue 14 notifies the queue connector 10 through the coupling 24. The coupling 24 is a socket connection, but in another embodiment, the coupling 24 may be a transmission control protocol/internet protocol (TCP/IP) network connection. In yet another embodiment, the coupling 24 may be a cable connecting two systems. The systems and methods described in the current disclosure do not depend on the exact form of the coupling 24, and it should be clear that the coupling 24 may take any number of forms.

Similarly, in the preferred embodiment, the wrapper process 18 may notify the queue connector 10 of a new message in the message queue 16 through the coupling 26. Like the coupling 24, the coupling 26 is a socket connection, but in another embodiment, the coupling 26 could take the form of a TCP/IP network connection. In yet another embodiment, the coupling 26 may be a cable connecting two systems. The systems and methods described in the current disclosure do not depend on the exact form of the coupling 26, nor does the form of the coupling 26 depend on the form of the coupling 24, and it should be clear that the coupling 26 may take any number of forms.

After the queue connector 10 receives notification of a message from the message queue 14 or from the wrapper process 18, the queue connector 10 accepts the message from either the message queue 14 or the message queue 16 respectively. However, the queue connector 10 does not allow the removal of the message from the message queue from which the message originates. The queue connector 10, in turn, begins delivery of the message to the business component 12. In the process of delivering the message to the business component 12, the queue connector 10 may in some embodiments transform the message.

The transformation of the message may include stripping away some portion of the message undesired for use by the business component 12; for example, the TCP/IP header of the message. The transformation of the message by the queue connector 10 may add information to the message, for example, by adding information regarding the date and time. The transformation of the message may also include reorganizing the information contained within the message. A transformation may increase the value of such messages for use by the business component 12, for instance, by arranging the messages from disparate sources such as the message queue 14 and the message queue 16 into a standard format for use by the business component 12.

In addition to transforming messages, the queue connector 10 may also generate a record which includes a record of the messages received from the message queue 14, a record of the message queue 16 by way of the wrapper process 18, a record of message delivery to the business component 12, a record of the transformation of the message, the content of the message, or some combination of the above. In a preferred embodiment, the queue connector 10 sends this record to a log 20 through a coupling 28. The log 20 may take different forms, depending on the embodiment, including but not limited to a file which lists the records from the queue connector 10, a database which stores the records from the queue connector 10, or a console which displays the records as they are received from the queue connector 10 by the log 20. The coupling 28 could in one embodiment take the form of a logging service on the system running the queue connector 10. Another embodiment could place the coupling 28 as a TCP/IP network connection to the log 20. In alternate preferred embodiment, the coupling 28 and the log 20 could be incorporated into the internal process of the queue connector 10.

In a preferred embodiment, the queue connector 10 may add to the record of the message the time and date associated with the message. Such information increases the value of the records. The information of the records sent from the queue connector 10 to the log 20 may be of use in the process of locating and eliminating errors in the distributed processing environment 100. The information in the records sent to the log 20 ease the process of locating and eliminating errors in the message queue 14, the message queue 16, or the wrapper process 18. The queue connector 10 may also send records regarding the performance and any associated errors of the queue connector 10 or the business component 12. Such records are also of use in the process of improving the performance of any of the elements described above and the performance of the entire process. It is useful to have a single source to search for such information as opposed to checking each element separately. Having information from such disparate sources recorded in a standard format adds additional value to the records kept by the log 20.

By the coupling 22, the business component 12 may send information to the queue connector 10. As part of the transformations that the queue connector 10 may perform upon the message, the queue connector 10 in a preferred embodiment may also transform the messages based on information provided by the business component 12. Transformations performed by the queue connector 10 as a result of the information provided by the business component 12 may change the priority for arbitrary types of messages. These transformations also allow selection of messages by topic or selection of messages by content, as determined by the information provided by the business component 12. Transformation performed by the queue connector 10 may also be used to delete or filter messages based on the information provided by the business component 12.

In addition to the recording of other information about the message, the queue connector 10 may include a tracekey, of a nature familiar to one of skill in the art, associated with the message in the records from the queue connector 10 sent to log 20 by the coupling 28. The tracekey may include information related the origin of the message on the system or process from which the message originates. This information may prove helpful in tracking the origin of errors in the system or process, as the lack of such information regarding the identification of the source of a message increases the difficulty of locating the source of errors in the system or process and removing the errors.

After performing any transformations, the queue connector 10 delivers the message to the business component 12 through the coupling 22. In a preferred embodiment, the business component 12 notifies the queue connector 10 through the coupling 22 upon completing processing of the message. After receiving such notification, the queue connector 10 sends notification to the queue of origin for the message. If the message originated from the message queue 14, for example, then the queue connector 10 notifies the message queue 14 through the coupling 24. The message queue 14 then consumes the message, and deletes it from the message queue 14. If the message originated from the message queue 16, then the queue connector 10 notifies the wrapper process 18 through the coupling 26. The wrapper process 18 in turn notifies the message queue 16, and the message queue 16 consumes the message, deleting it from the message queue 16. As such, the present disclosure prevents the loss of a message should a server fail to complete the processing of a message from the message queue, perhaps because of a hardware failure, a software bug, or a system overload. This functionality allows an increase in the integrity and reliability of the message service as a whole.

In addition, such improvements may allow for an extension to the amount of control the queue connector 10 may exercise on the rate of delivery of messages to the business component 12. As the queue connector 10 controls when notification of a message is sent to the business component 12, the queue connector 10 may control the rate of flow of messages from either the message queue 14 or the message queue 16 to the business component 12. The queue connector 10 promotes improved overall performance of the distributed process environment 100 by such actions as reducing the processes on an aspect of the system which has reached capacity, and by distributing the processes among the distributed process environment.

While several embodiments have been provided in the present disclosure, it should be understood that the queuing connector to promote message servicing may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be in communication with one another. Other examples of changes, substitutions, and alterations are readily ascertainable by one skilled in the art and could be made without departing from the spirit and scope disclosed herein.

The invention claimed is:

1. A system for message service, comprising:
   a memory operable to store computer executable instructions;
   a processor operable to execute the computer executable instructions, said instructions comprising:
   a business component utilizing messages;
   a first queue to manage message services, the first queue employing a polling notification type architecture;
   a second queue employing a publication/subscription notification type of architecture;
   a wrapper to enable the first queue to operate a publication/subscription notification type of architecture, wherein the wrapper performs the function of querying the first queue to determine the existence of new messages; and a queue connector in communication with the first queue via the wrapper, wherein the wrapper publishes new messages to the queue connector, the queue connector further in communication with the business component and the second queue, the queue connector receiving messages from the first queue via the wrapper and sending the messages being received from the first queue via the wrapper to the business component, thereby enabling a user to utilize the business component to access information in the messages from the first queue the queue connector further sending messages being received from the second queue to the business component.

2. The system of claim 1, wherein the queue connector removes a portion of the received messages undesired for use by the business component.

3. The system of claim 1, wherein an address identifying a location of at least one of the messages of the first queue is located in a file.

4. The system of claim 1, wherein an address identifying the location of at least one of the messages of the first queue is on a socket connection.

5. The system of claim 1, wherein an address identifying the location of at least one of the messages of the first queue is on a port connection.

6. The system of claim 1, wherein the queue connector adds information to the received messages desired for use by the business component.

7. The system of claim 1, wherein the queue connector is further operable to communicate the messages from the business component to at least one of the first and second queues.

8. The system of claim 1, wherein the second queue is further defined as a Java Message Service OMS) queue.

9. The system of claim 8, wherein the JMS queue receives messages from a file.

10. The system of claim 8, wherein the JMS queue receives messages from a Universal Resource Identifiers (URI) remotely.

11. The system of claim 1, wherein the wrapper is further defined as a JMS enabled wrapper.

12. The system of claim 1, wherein the second queue is further defined as JMS standards application programming interface (API) operable for inter-client communication.

13. The system of claim 1, wherein the queue connector changes a priority of the received messages based on information provided by the business component.

14. The system of claim 1, wherein the queue connector deletes or filters the received messages based on information provided by the business component.

15. The system of claim 1, wherein the queue connector is operable to control a rate of flow in which the received messages are delivered to the business component.

16. A system of a queue connector to promote message services, comprising:

a memory operable to store computer executable instructions;

a processor operable to execute the computer executable instructions, said instructions comprising:

a first component to communicate messages with a publication/subscription notification type queue;

a second component configured to communicate messages with a polling notification type queue, by registering with a wrapper, the wrapper providing a publication/subscription type notification to the queue connector of new messages in the polling notification type queue, wherein the wrapper performs the function of querying the polling notification type queue to determine the existence of the new messages;

a business component interface to communicate with business components thereby enabling a user to utilize the business components to access information in the messages; and a transaction component to verify that messages from one of the queues are received by the business components before the messages are consumed, the transaction component deleting a message from one of the queues upon verification of receipt of the message by the business components from the queue from which the message originated.

17. The system of claim 16, further comprising a logging component to record information related to the messages including a record of at least some of a message communicated between one of the publication/subscription notification type queue and the polling notification type queue other than the publication/subscription type queue and the business component.

18. The system of claim 17, wherein the record includes a date and time associated with each of the messages.

19. The system of claim 17, wherein the record includes a tracekey associated with each of the messages.

20. The system of claim 19, wherein the tracekey includes information related to the message.

21. The system of claim 20, wherein the information included with the tracekey includes a location of the message.

22. The system of claim 20, wherein the information included with the tracekey includes an origin of the message.

23. The system of claim 20, wherein the information included with the tracekey includes a type of the message.

24. The system of claim 20, wherein the information included with the tracekey includes a size of the message.

25. The system of claim 16, wherein the first component is a Vitria businessware component.

26. The system of claim 16, wherein the notification type queue is an MQ series queue.

27. The system of claim 16, wherein the wrapper queries the first queue to determine if a new message has been received by the first queue.

28. The system of claim 16, wherein the wrapper queries the second component to determine if a new message has been received by the second component.

* * * * *